(12) United States Patent
Byrne et al.

(10) Patent No.: US 11,146,083 B2
(45) Date of Patent: Oct. 12, 2021

(54) FURNITURE-MOUNTED CHARGING STATION

(71) Applicants: Norman R. Byrne, Ada, MI (US);
Timothy J. Warwick, Sparta, MI (US);
Anthony M. Nicolette, Sparta, MI (US)

(72) Inventors: Norman R. Byrne, Ada, MI (US);
Timothy J. Warwick, Sparta, MI (US);
Anthony M. Nicolette, Sparta, MI (US)

(*) Notice: Subject to any disclaimer, the term of this patent is extended or adjusted under 35 U.S.C. 154(b) by 0 days.

(21) Appl. No.: 16/773,416

(22) Filed: Jan. 27, 2020

(65) Prior Publication Data
US 2020/0161883 A1 May 21, 2020

Related U.S. Application Data

(63) Continuation of application No. 15/456,941, filed on Mar. 13, 2017, now Pat. No. 10,547,188.

(60) Provisional application No. 62/306,879, filed on Mar. 11, 2016.

(51) Int. Cl.
| | |
|---|---|
| *H02J 7/00* | (2006.01) |
| *H01R 13/66* | (2006.01) |
| *H02J 7/34* | (2006.01) |
| *H01R 13/73* | (2006.01) |
| *H01R 27/02* | (2006.01) |

(52) U.S. Cl.
CPC ........ *H02J 7/0045* (2013.01); *H01R 13/6675* (2013.01); *H01R 13/73* (2013.01); *H01R 27/02* (2013.01); *H02J 7/0027* (2013.01); *H02J 7/0042* (2013.01); *H02J 7/342* (2020.01); *H02J 7/00* (2013.01)

(58) Field of Classification Search
CPC ................................. H02J 7/0054; H02J 7/342
USPC ........................................................... 320/103
See application file for complete search history.

(56) References Cited

U.S. PATENT DOCUMENTS

| | | |
|---|---|---|
| 3,006,589 A | 10/1961 | Drysdale |
| 3,049,688 A | 8/1962 | Sinoploi |
| 4,266,266 A | 5/1981 | Sanner |
| 4,300,087 A | 11/1981 | Meisner |
| 4,323,723 A | 4/1982 | Fork et al. |
| 4,453,059 A | 6/1984 | Fukushima |
| D291,300 S | 8/1987 | Chaney |
| 4,747,788 A | 5/1988 | Byrne |
| 4,828,513 A | 5/1989 | Morrison et al. |
| 5,057,039 A | 10/1991 | Persing et al. |

(Continued)

FOREIGN PATENT DOCUMENTS

| | | |
|---|---|---|
| CN | 202552802 | 11/2012 |
| JP | 2013258886 | 12/2013 |
| WO | 2013112185 | 8/2013 |

*Primary Examiner* — David V Henze-Gongola
(74) *Attorney, Agent, or Firm* — Gardner, Linn, Burkhart & Ondersma LLP (57) ABSTRACT

A self-contained electrical charging station includes a housing configured for coupling to a furniture article. The charging station includes an electrical output connector that is accessible from outside the housing, an electrical input connector supported at the housing and also accessible from outside the housing, and a self-contained electrical power source such as a rechargeable battery. The self-contained electrical power source is configured to be simultaneously electrically engaged with the electrical input connector and mechanically supported by at least one of the electrical input connector, the housing, or associated structure.

20 Claims, 5 Drawing Sheets

(56) References Cited

U.S. PATENT DOCUMENTS

| | | |
|---|---|---|
| 5,130,494 A | 7/1992 | Simonton et al. |
| 5,171,159 A | 12/1992 | Byrne |
| 5,195,288 A | 5/1993 | Penczak |
| 5,230,552 A | 7/1993 | Schipper et al. |
| 5,351,173 A | 9/1994 | Byrne |
| D355,890 S | 2/1995 | Lentz |
| 5,404,279 A | 3/1995 | Wood |
| 5,472,157 A | 12/1995 | Lehrman |
| 5,501,614 A | 3/1996 | Tsuchiya |
| 5,575,668 A | 11/1996 | Timmerman |
| 5,709,156 A | 1/1998 | Gevaert et al. |
| 5,715,761 A | 2/1998 | Frattini |
| 5,765,932 A | 6/1998 | Domina et al. |
| 5,814,968 A | 9/1998 | Lovegreen et al. |
| D408,352 S | 4/1999 | Tashiro |
| D413,571 S | 9/1999 | Glass |
| 5,954,525 A | 9/1999 | Siegal et al. |
| 5,959,433 A | 9/1999 | Rohde |
| 5,964,618 A | 10/1999 | McCarthy |
| 6,004,157 A | 12/1999 | Glass |
| 6,028,267 A | 2/2000 | Byrne |
| 6,028,413 A | 2/2000 | Brockmann |
| 6,036,516 A | 3/2000 | Byrne |
| 6,081,356 A | 6/2000 | Branc et al. |
| 6,254,427 B1 | 7/2001 | Stathis |
| 6,290,518 B1 | 9/2001 | Byrne |
| 6,379,182 B1 | 4/2002 | Byrne |
| 6,436,299 B1 | 8/2002 | Baarman et al. |
| 6,492,591 B1 | 12/2002 | Metcalf |
| 6,540,554 B2 | 4/2003 | McCarthy |
| 6,589,073 B2 | 7/2003 | Lee |
| 6,595,144 B1 | 7/2003 | Doyle |
| 6,619,980 B1 | 9/2003 | Hsiao |
| D486,793 S | 2/2004 | Gershfeld |
| 6,689,954 B2 | 2/2004 | Vaughan et al. |
| 6,717,053 B2 | 4/2004 | Rupert |
| 6,756,697 B2 | 6/2004 | Mizutani et al. |
| 6,803,744 B1 | 10/2004 | Sabo |
| 6,875,051 B2 * | 4/2005 | Pizak ............ H01R 25/003 439/501 |
| 6,885,796 B2 | 4/2005 | Lubkert et al. |
| 6,967,462 B1 | 11/2005 | Landis |
| 6,971,911 B2 | 12/2005 | Ramsey et al. |
| 7,083,421 B1 | 8/2006 | Mori |
| 7,149,099 B2 | 12/2006 | Asbery |
| D535,257 S | 1/2007 | Byrne |
| 7,183,504 B2 | 2/2007 | Byrne |
| 7,212,414 B2 | 5/2007 | Baarman |
| 7,222,031 B2 | 5/2007 | Heatley |
| 7,223,122 B2 | 5/2007 | Mori |
| 7,233,222 B2 | 6/2007 | Baarman et al. |
| 7,236,087 B2 | 6/2007 | Vasquez et al. |
| 7,262,700 B2 | 8/2007 | Hsu |
| 7,355,150 B2 | 4/2008 | Baarman et al. |
| 7,392,068 B2 | 6/2008 | Dayan et al. |
| 7,399,202 B2 | 7/2008 | Dayan et al. |
| 7,407,392 B2 | 8/2008 | Cooke et al. |
| 7,443,057 B2 | 10/2008 | Nunally |
| 7,465,178 B2 | 12/2008 | Byrne |
| 7,488,203 B2 | 2/2009 | Leddusire |
| 7,633,263 B2 | 12/2009 | Toya |
| 7,736,178 B2 | 6/2010 | Byrne |
| 7,817,405 B2 | 10/2010 | Neumann et al. |
| 7,863,861 B2 | 1/2011 | Cheng et al. |
| 7,878,845 B2 | 2/2011 | Byrne |
| 7,887,113 B2 | 2/2011 | Lambarth et al. |
| D636,728 S | 4/2011 | Terleski et al. |
| 7,938,679 B2 | 5/2011 | Wadsworth et al. |
| 8,061,864 B2 | 11/2011 | Metcalf et al. |
| 8,076,900 B1 | 12/2011 | Brown |
| 8,106,539 B2 | 1/2012 | Schatz et al. |
| 8,203,307 B2 | 6/2012 | Zick et al. |
| 8,262,244 B2 | 9/2012 | Metcalf et al. |
| 8,283,812 B2 | 10/2012 | Azancot et al. |
| 8,295,036 B2 | 10/2012 | Byrne |
| 8,395,353 B2 | 3/2013 | Wang et al. |
| 8,398,408 B1 | 3/2013 | Hansen et al. |
| 8,421,407 B2 | 4/2013 | Johnson |
| 8,444,432 B2 | 5/2013 | Byrne et al. |
| 8,456,038 B2 | 6/2013 | Azancot et al. |
| 8,480,429 B2 | 7/2013 | Byrne |
| 8,482,160 B2 | 7/2013 | Johnson et al. |
| 8,487,478 B2 | 7/2013 | Kirby et al. |
| 8,497,601 B2 | 7/2013 | Hall et al. |
| 8,558,661 B2 | 10/2013 | Zeine |
| 8,559,172 B2 | 10/2013 | Byrne |
| 8,581,444 B2 | 11/2013 | Urano |
| 8,596,588 B1 | 12/2013 | Sikkema et al. |
| 8,618,695 B2 | 12/2013 | Azancot et al. |
| 8,624,750 B2 | 1/2014 | Azancot |
| D701,830 S | 4/2014 | Edwards |
| 8,721,124 B2 | 5/2014 | Byrne et al. |
| 8,901,419 B2 | 12/2014 | Galasso |
| 8,937,407 B2 | 1/2015 | Byrne et al. |
| 8,951,054 B2 | 2/2015 | Byrne et al. |
| 9,000,298 B2 | 4/2015 | Byrne |
| 9,084,475 B2 | 7/2015 | Hjelm |
| 9,148,006 B2 | 9/2015 | Byrne et al. |
| 9,362,764 B2 | 6/2016 | Farkas et al. |
| 9,385,549 B2 | 7/2016 | Miller et al. |
| 9,438,070 B2 | 9/2016 | Byrne et al. |
| 9,484,751 B2 | 11/2016 | Byrne et al. |
| 9,513,682 B2 | 12/2016 | Fleisig |
| 9,543,692 B2 | 1/2017 | Shomali |
| 9,608,455 B2 | 3/2017 | Byrne et al. |
| 10,181,735 B2 | 1/2019 | Byrne et al. |
| 10,547,188 B2 * | 1/2020 | Byrne .................. H02J 7/342 |
| 2002/0119698 A1 | 8/2002 | McCarthy |
| 2002/0171335 A1 | 11/2002 | Held |
| 2003/0048254 A1 | 3/2003 | Huang |
| 2003/0185515 A1 | 10/2003 | Lubkert et al. |
| 2003/0186582 A1 | 10/2003 | Laukhuf et al. |
| 2003/0202317 A1 | 10/2003 | Jans |
| 2004/0026998 A1 | 2/2004 | Henriott et al. |
| 2004/0150934 A1 | 8/2004 | Baarman |
| 2004/0189246 A1 | 9/2004 | Bulai et al. |
| 2005/0209933 A1 | 9/2005 | Thompson |
| 2005/0225292 A1 | 10/2005 | Damlamian et al. |
| 2006/0159064 A1 | 7/2006 | Harnois |
| 2006/0258195 A1 | 11/2006 | Schwartz et al. |
| 2007/0182367 A1 | 8/2007 | Partovi |
| 2007/0247037 A1 | 10/2007 | Schenker |
| 2007/0279002 A1 | 12/2007 | Partovi |
| 2008/0001572 A9 | 1/2008 | Baarman et al. |
| 2008/0079392 A1 | 4/2008 | Baarman et al. |
| 2008/0166965 A1 | 7/2008 | Greene et al. |
| 2008/0169910 A1 | 7/2008 | Greene et al. |
| 2008/0200050 A1 | 8/2008 | Byrne |
| 2008/0262932 A1 | 10/2008 | Wareham |
| 2009/0012634 A1 | 1/2009 | Koch |
| 2009/0032660 A1 | 2/2009 | Wadsworth et al. |
| 2009/0045772 A1 | 2/2009 | Cook et al. |
| 2009/0156061 A1 | 6/2009 | Bernstein |
| 2009/0212636 A1 | 8/2009 | Cook et al. |
| 2009/0212638 A1 | 8/2009 | Johnson |
| 2009/0230777 A1 | 9/2009 | Baarman et al. |
| 2009/0271048 A1 | 10/2009 | Wakamatsu |
| 2009/0278494 A1 | 11/2009 | Randall |
| 2010/0007307 A1 | 1/2010 | Baarman et al. |
| 2010/0038970 A1 | 2/2010 | Cook et al. |
| 2010/0052431 A1 | 3/2010 | Mita |
| 2010/0127660 A1 | 5/2010 | Cook et al. |
| 2010/0187913 A1 | 7/2010 | Smith et al. |
| 2010/0201201 A1 | 8/2010 | Mobarhan et al. |
| 2010/0244584 A1 | 9/2010 | Azancot et al. |
| 2010/0259401 A1 | 10/2010 | Azancot et al. |
| 2010/0290215 A1 | 11/2010 | Metcalf et al. |
| 2010/0308665 A1 | 12/2010 | Itkonen |
| 2010/0321939 A1 | 12/2010 | Patel |
| 2011/0006611 A1 | 1/2011 | Baarman et al. |
| 2011/0062789 A1 | 3/2011 | Johnson et al. |
| 2011/0109211 A1 | 5/2011 | Kirkeby et al. |
| 2011/0121660 A1 | 5/2011 | Azancot et al. |
| 2011/0175544 A1 | 7/2011 | Jong |

(56) References Cited

U.S. PATENT DOCUMENTS

| | | |
|---|---|---|
| 2011/0193417 A1 | 8/2011 | Hirasaka et al. |
| 2011/0241607 A1 | 10/2011 | Wiegers |
| 2011/0241614 A1 | 10/2011 | Yeh |
| 2011/0248575 A1 | 10/2011 | Kim et al. |
| 2011/0260548 A1 | 10/2011 | Urano |
| 2011/0305056 A1 | 12/2011 | Chien |
| 2012/0113576 A1 | 5/2012 | Cooper et al. |
| 2012/0113645 A1 | 5/2012 | Liao et al. |
| 2012/0117730 A1 | 5/2012 | Lemire et al. |
| 2012/0153731 A9 | 6/2012 | Kirby et al. |
| 2012/0206097 A1 | 8/2012 | Soar |
| 2012/0228953 A1 | 9/2012 | Kesler et al. |
| 2012/0235474 A1 | 9/2012 | Mannino et al. |
| 2012/0261998 A1 | 10/2012 | Sato |
| 2012/0299539 A1 | 11/2012 | Jones et al. |
| 2012/0312196 A1 | 12/2012 | Newkirk |
| 2013/0049482 A1 | 2/2013 | Rofe et al. |
| 2013/0057203 A1 | 3/2013 | Jones et al. |
| 2013/0141038 A1 | 6/2013 | Papa |
| 2013/0175986 A1 | 7/2013 | Senatori |
| 2013/0200717 A1 | 8/2013 | Bourilkov et al. |
| 2013/0207478 A1 | 8/2013 | Metcalf et al. |
| 2013/0234481 A1 | 9/2013 | Johnson |
| 2013/0285606 A1 | 10/2013 | Ben-Shalom et al. |
| 2014/0098525 A1 | 4/2014 | Bennett |
| 2014/0191568 A1 | 7/2014 | Partovi |
| 2014/0195336 A1 | 7/2014 | Dublin, III et al. |
| 2014/0335919 A1 | 11/2014 | Stewart et al. |
| 2014/0361633 A1 | 12/2014 | Abe |
| 2015/0007756 A1 | 1/2015 | Kollreider et al. |
| 2015/0008879 A1 | 1/2015 | Schneider et al. |
| 2015/0015182 A1 | 1/2015 | Brandtman et al. |
| 2015/0096473 A1 | 4/2015 | Leukel et al. |
| 2016/0050375 A1 | 2/2016 | Soffer |
| 2016/0197504 A1* | 7/2016 | Hsia .................. H02J 9/062 307/23 |
| 2019/0027874 A1 | 1/2019 | Byrne et al. |

* cited by examiner

FURNITURE-MOUNTED CHARGING STATION

CROSS REFERENCE TO RELATED APPLICATION

The present application is a continuation of U.S. patent application Ser. No. 15/456,941, filed Mar. 13, 2017, now U.S. Pat. No. 10,547,188, which claims the benefit of U.S. provisional application Ser. No. 62/306,879, filed Mar. 11, 2016, both of which are hereby incorporated herein by reference in their entireties.

FIELD OF THE INVENTION

The present invention relates to electrical power supplies and, more particularly, to electrical power supplies having rechargeable batteries or the like.

BACKGROUND OF THE INVENTION

Battery-equipped electrical supplies are used to provide a convenient but limited supply of electrical power at various locations that may be separated from, or that may not have convenient access to, traditional wired power supplies.

SUMMARY OF THE INVENTION

The present invention provides an independently-powered or self-powered electrical charging station that can be mounted to work surfaces, tables, desks, and the like, and which is supplied with electrical energy from a rechargeable battery or other independent and replaceable power source (e.g., a capacitor or fuel cell), to provide at least a limited amount of electrical energy for charging portable phones, handheld computers and media players, and other electrical or electronic devices, especially portable electrical or electronic devices. The power unit may include several electrical connectors or receptacles or ports that allow multiple devices to be charged or supplied with power simultaneously. The battery or other self-contained power source associated with the power unit may attach to the unit in an unobtrusive location, such as along a rear housing surface, and may be readily replaceable with a fully charged battery or the like when the charge of an initial battery or energy storage device has been depleted. A multi-bay charger may be provided to recharge depleted batteries, and it is envisioned that a sufficient number of batteries and chargers may be used to ensure that the power units in a given area can be maintained at sufficient charge level, with only a very short interruption of power during changing of a battery.

According to one form of the present invention, a furniture-mounted electrical charging station includes a receptacle housing configured for coupling to a furniture article, an electrical output connector, and electrical input connector, and a self-contained electrical power source. The receptacle housing defines an interior region, where the electrical output connector is mounted and made accessible from outside the receptacle housing. The electrical input connector is also positioned in the interior region of the receptacle housing, and is also accessible from outside of the receptacle housing, and is configured for engagement by an electrical input connector of the self-contained electrical power source. The self-contained electrical power source is configured to be simultaneously electrically engaged to the electrical input connector and mechanically supported by the electrical input connector and/or by the receptacle housing. The self-contained electrical power source is removably mounted at the receptacle housing, so that it can be readily swapped out for another self-contained electrical power source.

In one aspect, the receptacle housing includes a forward surface and a rearward surface that is located opposite the forward surface. The electrical output connector is accessible at the forward surface and the electrical input connector is accessible through an opening formed in the rearward surface. Optionally, the self-contained electrical power source includes a projection that is received through the opening defined in the receptacle housing's rearward surface, and the self-contained electrical power source further includes a source output connector along the projection, the source output connector provided for electrically engaging the electrical input connector. Optionally, the projection includes a source input connector that is configured to receive an electrical charging current from a charger.

In another aspect, the self-contained electrical power source includes a power source housing that remains outside of the receptacle housing when the self-contained electrical power source is mounted at the receptacle housing.

In yet another aspect, a multi-bay battery charger is provided for simultaneously supporting and recharging at least two of the self-contained electrical power sources.

In still another aspect, the self-contained power source includes a rechargeable battery, a rechargeable capacitor, or a fuel cell.

In a further aspect, the electrical output connector includes a low voltage DC receptacle such as, for example, a USB charging receptacle or a coaxial charging receptacle.

In a still further aspect, a mounting bracket is provided for securing the receptacle housing to a downwardly-facing surface of the furniture article, which may be a table, a desk, a workbench, or the like. Optionally, the mounting bracket is L-shaped and includes an upper horizontal leg that is securable to a downwardly-facing bottom surface of the furniture article, and a forward leg that extends downwardly from a forward end of the upper horizontal leg, and the receptacle housing is connected to the forward leg. Optionally, the forward leg defines an opening through which the electrical output connector is made accessible to users.

According to another form of the present invention, a furniture-mounted electrical charging station includes a housing configured to be secured along a downwardly-facing lower surface of a furniture article, a rechargeable electrical power source, and an electrical output and electrical input connector both mounted at the housing. The electrical output is mounted at the housing and is operable to convey electrical power to a portable electronic device that is positioned along an upper surface of the furniture article. The electrical input connector is accessible from outside the housing, and is configured to be electrically energized by the rechargeable electrical power source, whereby the rechargeable electrical power source is operable to supply electrical power to the electrical power output via the electrical input connector.

In one aspect, the electrical output is a low voltage DC connector that is configured to receive a charging plug associated with the portable electronic device.

In another aspect, the rechargeable electrical power source and the housing are cooperatively configured for simultaneous electrical and mechanical connection of the rechargeable electrical power source to the housing, whereby the rechargeable electrical power source is directly supported by the housing.

Thus, the furniture-mounted electrical charging station of the present invention provides a source of electrical energy at portable furniture articles, which is capable of charging or energizing small electrical or electronic devices, and which permits the associated furniture articles to be moved to substantially any desired location without regard for the location of traditional wall outlets or other wired power sources. The charging station is energized by a self-contained electrical power source, such as a rechargeable battery, which is readily removed, replaced with a charged battery or power source, and recharged for later use.

These and other objects, advantages, purposes and features of the present invention will become apparent upon review of the following specification in conjunction with the drawings.

DESCRIPTION OF THE PREFERRED EMBODIMENTS

Referring now to the drawings and the illustrative embodiments depicted therein, a furniture-mounted electrical charging station 10 is configured for mounting to a table 12, or to a desk, work surface, room divider, or substantially any furniture article where a self-contained power source may be desired. Charging station 10 is particularly well-suited for use with portable furniture articles such as chairs, tables, and desks in reconfigurable spaces such as cafes, restaurants, bars, banquet halls, airports and other public transit spaces, and in office or work areas. For example, patrons of bars and cafes often desire to move tables together or apart in order to accommodate different groups or to achieve a desired level of privacy, and also have a need to recharge small electronic devices such as mobile phones, media players, handheld computers, and tablet computers, all of which are commonly charged via low voltage DC connectors and cords. By mounting a self-contained charging station at a movable table 12 or the like, patrons and/or staff are free to move the table or other furniture article to any desired location, while still having access to low voltage DC power for recharging purposes, without connecting the charging station to a wall outlet or other separate electrical power source.

Figure 1:
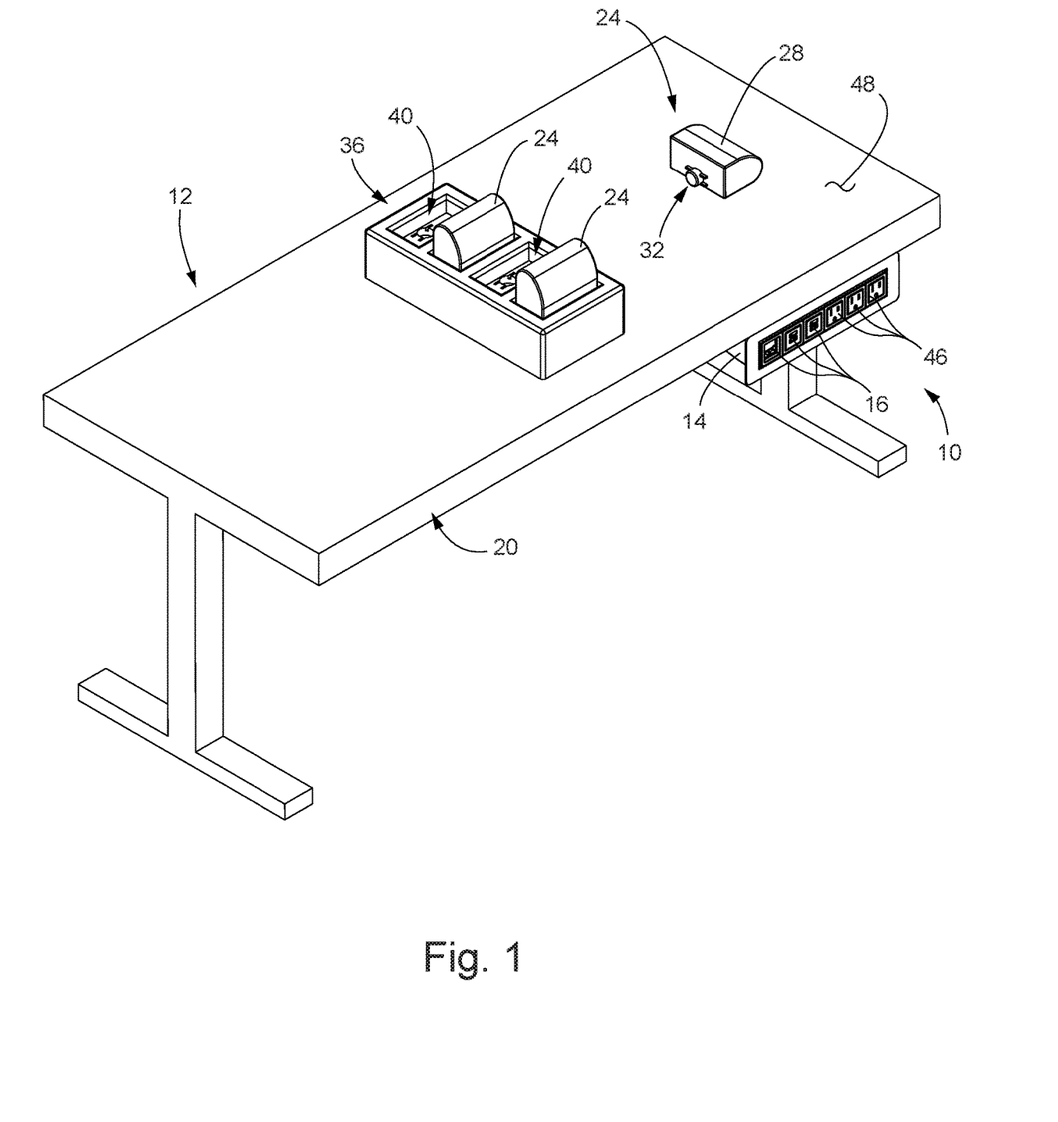
FIG. 1 is a perspective view of a furniture-mounted electrical charging station in accordance with the present invention, shown in an under-mount location along a table, and with a multi-bay battery charger and spare batteries supported on an upper surface of the table.
Figure 2:
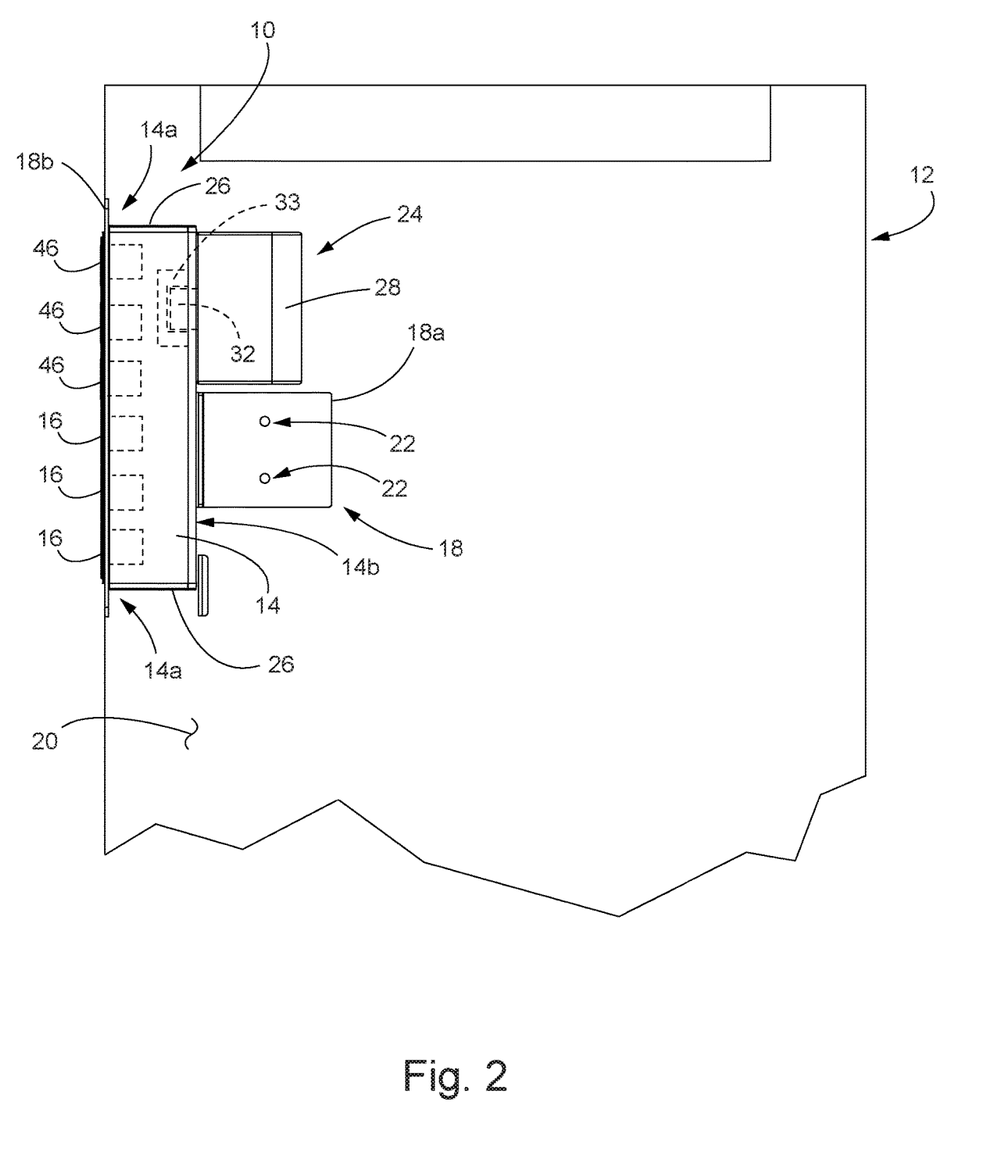
FIG. 2 is a bottom plan view of the furniture-mounted electrical charging station and surrounding portion of the table of FIG. 1.

Furniture-mounted electrical charging station 10 includes a housing 14 that defines an interior region and supports one or more electrical output connectors 16 that are mounted in the interior region and are accessible from outside the housing 14, such as shown in FIG. 1. In the illustrated embodiment, charging station 10 is configured for mounting to an underside of table 12. For example, and with reference to FIGS. 2 and 3, a generally L-shaped bracket 18 may be provided which has an upper horizontal leg 18a that is securable to a bottom surface 20 of table 12, and a forward vertical leg 18b that supports housing 14 and has a generally rectangular central opening so as to form a bezel around electrical output connectors 16 that are mounted to housing 14. Bracket 18 may be secured to bottom surface 20 of table 12 using threaded bolts or screws that extend upwardly through openings 22 that are formed in the upper horizontal leg 18a, such as shown in FIG. 2. Optionally, a housing may be provided which includes provisions (such as threaded or smooth-bore holes, bracket-receiving features, or the like) to facilitate its direct attachment to table 12. For example, a bracket that couples to the table bottom surface 20 and a top surface 14c of housing 14 may be used, in which case an optional forward bezel (similar in appearance to the forward vertical leg 18b of bracket 18, described above) may be coupled and supported to the output connectors 16 and/or the forward end 14a of the housing 14, to provide a finished appearance from the front of the furniture-mounted electrical charging station 10.

In the illustrated embodiment, housing 14 is formed as an extrusion having a generally C-shaped cross section defining a slot-like opening at its forward or front end 14a, and having an opening formed in the housing at a rearward or back end 14b for receiving at least a connector portion of a self-contained electrical power source 24. Housing 14 is closed off at its left and right sides or ends by respective end caps 26, and is configured to support one or more of the electrical output connectors 16 that it receives in a sliding manner. Such housing and connector arrangements are more fully described in commonly-owned U.S. Pat. Nos. 8,480, 429 and 8,444,432, both of which are hereby incorporated herein by reference in their entireties.

Self-contained electrical power source 24 may be a rechargeable battery or capacitor, a fuel cell, or the like, and includes an outer housing 28 with a front face 30 from which an electrical connector projection 32 extends, such as shown in FIGS. 1 and 8-13. Connector projection 32 is configured to extend through the opening formed in the rearward end 14b of housing 14, and includes an electrical source output connector (i.e., electrical terminals) that electrically engages a corresponding electrical input connector 33 disposed in the interior of housing 14. The electrical input connector 33 located inside the housing 14 is configured to direct electrical power from power source 24 to the electrical output connectors 16. In addition to having an electrical source output connector or terminals for supplying energy to connectors 16, connector projection 32 is configured to permit power source 24 to be mechanically supported by the electrical input connector 33 located inside the housing 14, by housing 14 itself, by receiving/supporting structure located in the housing interior, or by a combination thereof.

Figure 3:
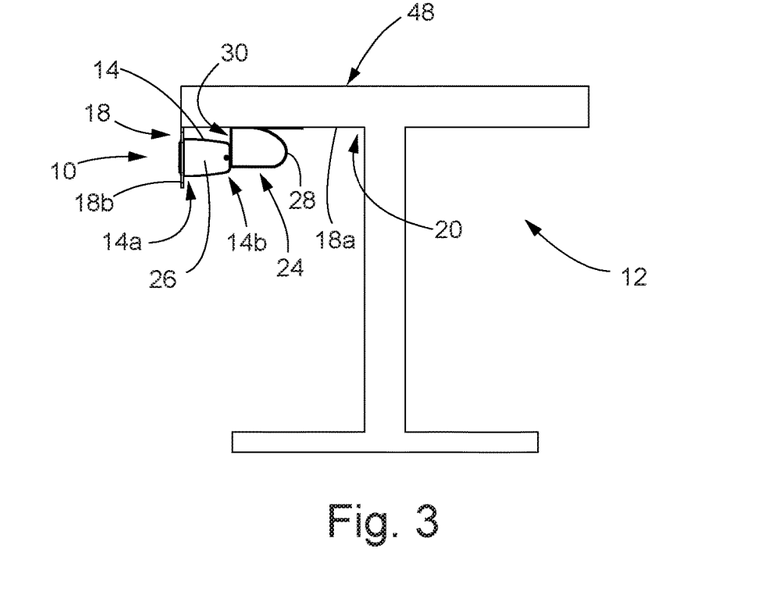
FIG. 3 is a left side elevation of the furniture-mounted electrical charging station and table of FIG. 1.

This arrangement allows the self-contained electrical power source 24 to be solely supported by housing 14 and/or by structure contained in the housing 14, such as shown in FIG. 3, which facilitates rapid manual removal and replacement of power source 24, such as for replacing a depleted power source (e.g., a rechargeable battery) with a compatible fully charged power source. In addition, in order to provide leg clearance for persons seated at table 12, it is envisioned that power source 24 will be positioned higher than a lowermost surface of housing 14. Thus, when power source 24 is supported at housing 14, a lowermost or bottom surface of the power source housing 28 is positioned at a higher elevation than the elevation of a lowermost surface of the housing 14, such as shown in FIG. 3. It is further envisioned that latch or security features may be used to limit or preclude unauthorized removal of power source 24 from housing 14, such as for use in public areas where theft or tampering may be a concern. For example, a resilient latch tab may be incorporated into (or added to) one or both housings 14, 28 to provide a snap-lock feature that secures the power source 24 to housing 14, but is easily releasable by depressing or pulling on a resilient latch tab. Optionally, a more secure arrangement may be used in which a specially-shaped "key" may be inserted into a shaped opening in housing 14 to release an internal latch.

Optionally, connector projection 32 includes an electrical source input connector or terminals that enable power source 24 to be recharged. It is envisioned that the electrical source output connector at connector projection 32 may also serve as the electrical source input connector for recharging the power source 24, although it is equally possible that separate terminals or contacts can be provided along connector projection 32 or elsewhere along housing 28 for recharging purposes. In the illustrated embodiment, connector projection 32 is keyed with four horizontal projecting walls 34 that project forwardly from front face 30 of housing 28, on either side of connector projection 32 and spaced vertically apart from one another, such as shown in FIGS. 8-13. Projecting walls 34 may preclude use of the power source 24 with incompatible power consumers, and may also provide for enhanced mechanical support of the power source 24 when coupled to the housing 14 and interior structure designed to support the weight of power source 24.

Figure 5:
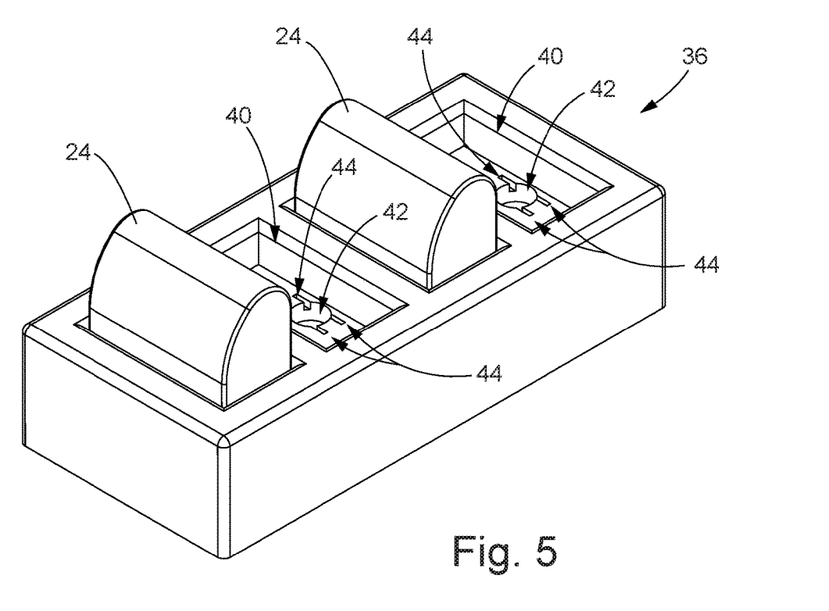
FIG. 5 is a perspective view of the multi-bay battery charger and two batteries of FIG. 1.
Figure 6:
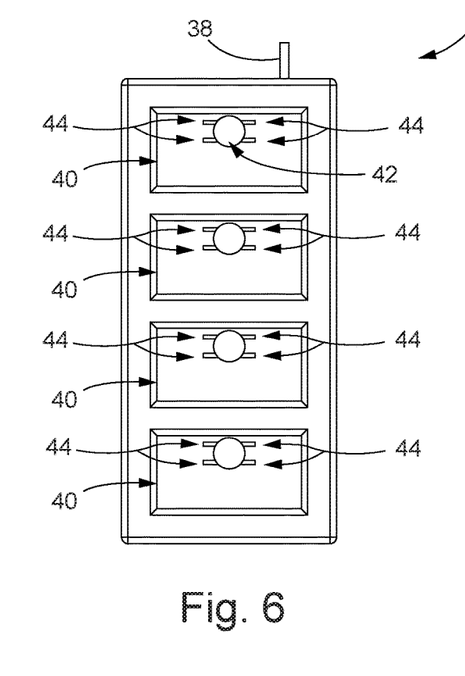
FIG. 6 is a top plan view of the multi-bay battery charger.
Figure 7:
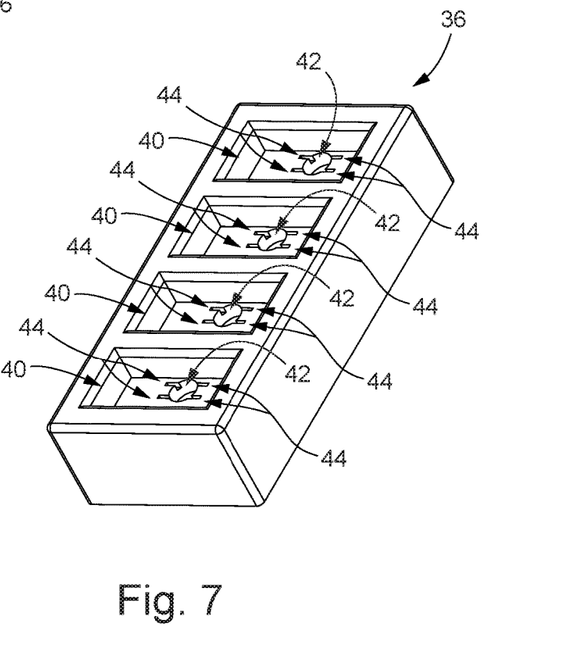
FIG. 7 is another perspective view of the multi-bay battery charger.
Figure 8:
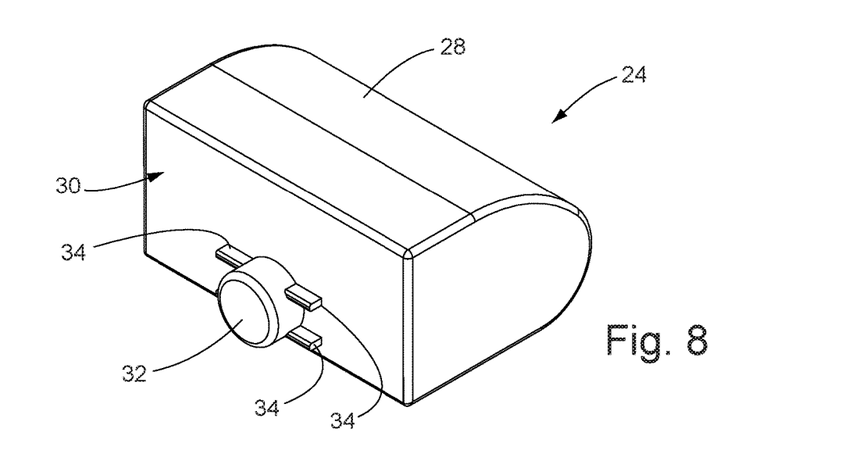
FIG. 8 is a front perspective view of a battery for use with the furniture-mounted electrical charging station.
Figure 9:
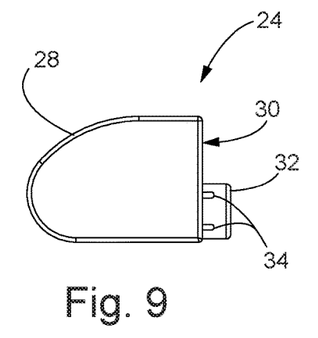
FIG. 9 is a right side elevation of the battery of FIG. 8.
Figure 10:
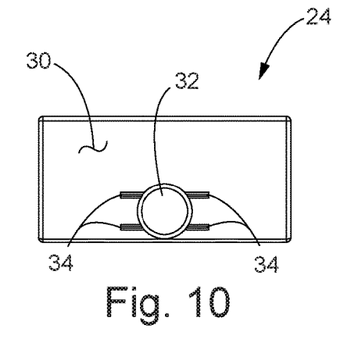
FIG. 10 is a front elevation of the battery of FIG. 8.
Figure 11:
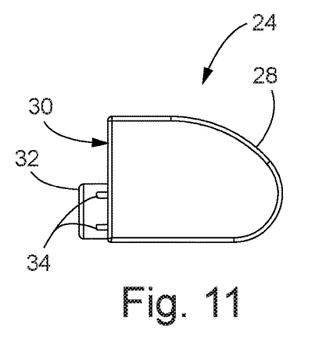
FIG. 11 is a left side elevation of the battery of FIG. 8.
Figure 12:
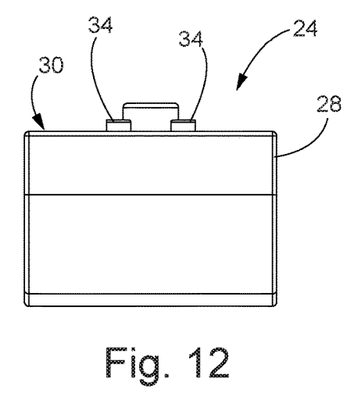
FIG. 12 is a top plan view of the battery of FIG. 8.
Figure 13:
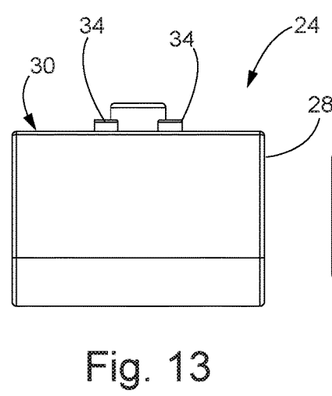
FIG. 13 is a bottom plan view of the battery of FIG. 8.
Figure 14:
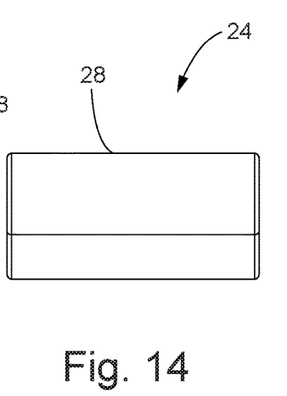
FIG. 14 is a rear elevation of the battery of FIG. 8.

Referring to FIGS. 1 and 5-7, a multi-bay battery charger 36 is provided for simultaneously recharging several of the self-contained electrical power sources 24 that are not in use. In the illustrated embodiment, battery charger 36 is supplied with electrical power via a power cord 38 (FIG. 6) and includes four bays 40, each configured to receive and electrically engage the electrical contacts of the electrical source input connector, located at connector projection 32, for recharging the power source 24. As best shown in FIGS. 5 and 7, each bay 40 includes a generally circular recess 42 for receiving a respective connector projection 32, which is generally cylindrical. Extending laterally outwardly from each projection-receiving recess 42 is a set of four slots 44, each configured to receive a respective one of projection walls 34 associated with the connector projection 32 of a given power source 24. It will be appreciated that the electrical input connector 33 of furniture-mounted electrical charging station 10 may be substantially identical in configuration to projection-receiving recess 42 and slots 44 of battery charger 36, and is located in the interior of housing 14 and accessible through the opening that is formed in rearward surface 14b.

It is envisioned that, in most applications, furniture-mounted electrical charging station 10 would primarily be used to supply small or portable electronic devices with low voltage DC power for recharging purposes. Therefore, electrical output connectors 16 may be low voltage DC connectors or receptacles of substantially any type, including USB connectors, mini-USB connectors, micro-USB connectors, USB-C connectors, round and/or co-axial receptacles or ports, and the like, and may include two or more electrical connectors of the same or different configurations to provide access to electrical power for common types of devices. In the illustrated embodiment, the C-shaped housing is readily fitted and re-fitted with substantially any desired selection of connectors, based on the needs of a particular application. Mobile phones, electronic media players, hand-held or tablet computers, and the like may be charged while they are resting atop the furniture article, such as via a direct electrical connection using a charging cord and a compatible plug for engagement with one of the low voltage DC outlets 16, or using wireless power transmission technologies such as magnetic field inductive resonance or electric field resonant capacitive coupling technologies.

Figure 4:
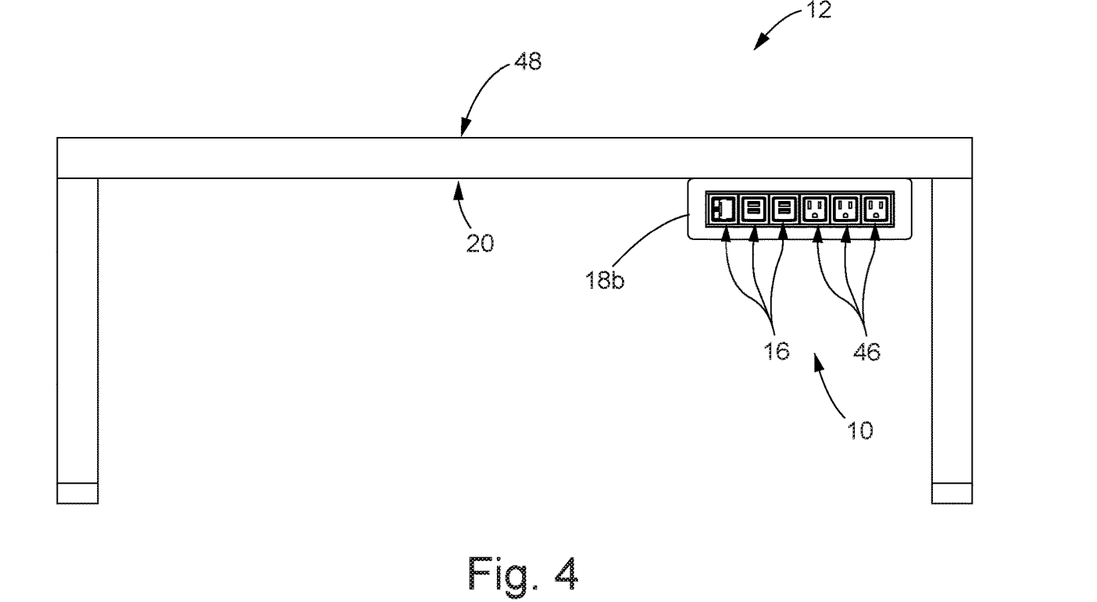
FIG. 4 is a front elevation of the furniture-mounted electrical charging station and table of FIG. 1.

Although the furniture charging stations described herein are primarily intended to provide users with access to low voltage DC power, it will be appreciated that high voltage AC power may optionally be provided at separate AC power outlets 46 (FIG. 4). AC power outlets 46 may be energized when charging station 10 is equipped with a rechargeable battery having sufficient capacity, and a DC-to-AC converter contained inside the interior of housing 14. It is also envisioned that AC outlets 46 may be energized only when a separate or optional power cord (not shown) is connected to an energized wall outlet or other power source to supply high voltage AC power directly to charging station 10.

In applications where the charging station is equipped with an optional AC power cord, low voltage DC outlets 16 and high voltage AC outlets 46 may be simultaneously energized by power received from the AC power cord (an AC-to-DC converter would be used to supply power to the low voltage DC outlets) and, optionally, may also be used to recharge self-contained power source 24 if one is coupled to the charging station 10. A cord-receiving space or winding structure may be provided near the charging station 10 to prevent any such cord from being obtrusively visible or becoming an obstruction during periods of non-use. It is further envisioned that wireless charging technologies may be used to recharge the self-contained power sources 24, either while the power sources 24 are coupled to respective charging stations 10, or in a dedicated battery charger similar to charger 36. In addition, charging station 10 may include provisions for wireless charging of portable electronic devices, such as with a support pad with conductive surfaces in an alternating-polarity arrangement, or with inductive or other contactless wireless charging technology directing wireless electrical energy through an upper surface 48 of table 12, or to another nearby surface where portable electronic devices with compatible wireless power receivers can be supported.

It is further envisioned that charging station 10 may be equipped with a power switch that selectively energizes and de-energizes the electrical output connector(s), and a charge level indicator to provide a visual or audible indication of the remaining energy capacity of self-contained power source 24. Optionally, charging station 10 may include circuitry enabling it to send a wireless signal to a monitoring station, the wireless signal including information such as energy level of the power source 24, current and historical rates of energy consumption, and approximately time remaining before power source 24 will need to be recharged. Moreover, it will be appreciated that although the charging station 10 is described and illustrated herein as being configured for under-mount applications, such as being attached to the bottom surface 20 of table 12 near a perimeter edge thereof, charging stations may be adapted for attachment to various other types of furniture articles and in other locations, such as mounted in an opening formed in a table or desk surface, along a wall or room divider, or under the seat portion of a chair, without departing from the spirit and scope of the present invention.

Accordingly, the furniture-mounted electrical charging station of the present invention provides a self-contained power supply that is capable of charging mobile phones and other small or portable electronic or electrical devices, and which may be particularly well suited for use by patrons or customers of commercial establishments or work areas in which a temporary low voltage power supply is occasionally needed or desired. The operators or administrators of many such establishments and work areas often permit or encourage patrons or users to move furniture as desired, so that the use of self-contained furniture-mounted electrical charging stations facilitates moving furniture and/or reconfiguring work or gathering areas without concern for power cords or disabling electrical power if the furniture is moved away from traditional wall outlets. Further, the use of readily-replaceable and rechargeable batteries or other types of electrical power sources permits operators to ensure that a sufficient energy source is substantially always available during periods of use.

Changes and modifications in the specifically-described embodiments may be carried out without departing from the principles of the present invention, which is intended to be limited only by the scope of the appended claims as interpreted according to the principles of patent law including the doctrine of equivalents.

The embodiments of the invention in which an exclusive property or privilege is claimed are defined as follows:

1. A furniture-mounted electrical charging station comprising:
   a housing having a front end and a back end, and defining an interior region between said front and back ends, wherein said interior region is accessible through an opening formed in said back end;
   an electrical output connector mounted at said front end of said housing and accessible from outside said housing;
   an electrical input connector positioned at said housing opposite said electrical output connector and accessible through said opening formed in said back end; and
   a self-contained electrical power source configured to be simultaneously electrically engaged to said electrical input connector and mechanically supported by at least one of said electrical input connector and said housing, said self-contained electrical power source comprising a power housing having a front face and a connector projection extending forwardly from said front face, wherein said connector projection is insertable through said opening in said back end of said housing, with said power housing extending rearwardly from said back end of said housing, and said front face of said power housing positioned adjacent to and facing said back end of said housing;
   wherein said self-contained electrical power source is removably mounted at said housing.

2. The furniture-mounted electrical charging station of claim 1, wherein said self-contained electrical power source comprises a source output connector disposed at said projection for electrically engaging said electrical input connector.

3. The furniture-mounted electrical charging station of claim 2, wherein said projection comprises a source input connector configured to receive an electrical charging current from a charger.

4. The furniture-mounted electrical charging station of claim 3, wherein said source output connector comprises said source input connector.

5. The furniture-mounted electrical charging station of claim 1, wherein the entirety of said power housing remains outside of said housing when said self-contained electrical power source is mounted at said housing.

6. The furniture-mounted electrical charging station of claim 1, further in combination with a multi-bay battery charger configured to simultaneously support and recharge at least two of said self-contained electrical power sources simultaneously.

7. The furniture-mounted electrical charging station of claim 1, wherein said self-contained power source comprises one chosen from a rechargeable battery, a rechargeable capacitor, and a fuel cell.

8. The furniture-mounted electrical charging station of claim 1, wherein said electrical output connector comprises a low voltage DC receptacle.

9. The furniture-mounted electrical charging station of claim 8, wherein said low voltage DC receptacle comprises a USB charging receptacle or a coaxial charging receptacle.

10. The furniture-mounted electrical charging station of claim 1, further comprising a mounting bracket configured to secure said housing to a downwardly-facing surface of the furniture article.

11. The furniture-mounted electrical charging station of claim 10, wherein said mounting bracket is generally L-shaped and comprises an upper horizontal leg securable to a downwardly-facing bottom surface of the furniture article, and a forward leg extending downwardly from a forward end of said upper horizontal leg, wherein said front end of said housing is connected to said forward leg.

12. The furniture-mounted electrical charging station of claim 11, wherein said forward leg defines an opening through which said electrical output connector is accessible.

13. The furniture-mounted electrical charging station of claim 12, comprising a plurality of said electrical output connectors, and wherein said opening defined by said forward leg of said mounting bracket comprises a substantially rectangular opening through which each of said electrical output connectors is accessible.

14. A furniture-mounted electrical charging station comprising:
   a housing having a front surface and a rearward surface spaced from said front surface, said housing defining an interior region between said front surface and said rearward surface, wherein said interior region is accessible through an opening formed in said rearward surface;
   an electrical output connector mounted at said front surface of said housing and accessible from outside said housing;
   an electrical input connector positioned inside said interior region and accessible through said opening; and
   a self-contained electrical power source configured to be simultaneously electrically engaged to said electrical input connector and mechanically supported by at least one of said electrical input connector and said housing, said self-contained electrical power source comprising a power housing and a connector projection extending from said power housing;

wherein said power housing and said connector projection are configured so that when said connector projection is inserted through said opening, said power housing remains entirely outside of said housing;

wherein said self-contained electrical power source is removably mounted at said housing; and wherein when said self-contained electrical power source is mounted at said housing, said power housing extends rearwardly from said rearward surface of said housing, and a front face of said power housing is positioned adjacent to and facing said rearward surface of said housing.

15. The furniture-mounted electrical charging station of claim 14, wherein:

said housing comprises a lower surface extending between said forward surface and said rearward surface; and said power housing is positioned entirely above said lower surface when said self-contained electrical power source is removably mounted at said housing.

16. The furniture-mounted electrical charging station of claim 14, further comprising a mounting bracket configured to secure said housing to a downwardly-facing surface of the furniture article, wherein said mounting bracket is generally L-shaped and comprises an upper horizontal leg securable to a downwardly-facing bottom surface of the furniture article, and a forward leg extending downwardly from a forward end of said upper horizontal leg, wherein said front end of said housing is connected to said forward leg.

17. The furniture-mounted electrical charging station of claim 14, wherein said electrical output connector is solely energized by said self-contained electrical power source whenever said self-contained electrical power source is electrically engaged with said electrical input connector.

18. A furniture-mounted electrical charging station comprising:

a housing having a front surface and a rearward surface spaced from said front surface, said housing defining an interior region between said front surface and said rearward surface, wherein said interior region is accessible through an opening formed in said rearward surface;

an electrical output connector mounted at said front surface of said housing and accessible from outside said housing;

an electrical input connector positioned inside said interior region and accessible through said opening; and a self-contained electrical power source configured to be simultaneously electrically engaged to said electrical input connector and mechanically supported by at least one of said electrical input connector and said housing, said self-contained electrical power source comprising a power housing and a connector projection extending from said power housing;

wherein said power housing and said connector projection are configured so that when said connector projection is inserted through said opening to electrically engage said electrical input connector, said power housing remains entirely outside of said housing;

wherein said self-contained electrical power source is removably mounted at said housing;

wherein said electrical output connector is solely energized by said self-contained electrical power source whenever said self-contained electrical power source is electrically engaged with said electrical input connector; and wherein when said self-contained electrical power source is mounted at said housing, said power housing extends rearwardly from said rearward surface of said housing, and a front face of said power housing is positioned adjacent to and facing said rearward surface of said housing.

19. The furniture-mounted electrical charging station of claim 18, wherein:

said housing comprises a lower surface extending between said forward surface and said rearward surface; and said power housing is positioned entirely above said lower surface when said self-contained electrical power source is removably mounted at said housing.

20. The furniture-mounted electrical charging station of claim 18, further comprising a mounting bracket configured to secure said housing to a downwardly-facing surface of the furniture article, wherein said mounting bracket is generally L-shaped and comprises an upper horizontal leg securable to a downwardly-facing bottom surface of the furniture article, and a forward leg extending downwardly from a forward end of said upper horizontal leg, wherein said front end of said housing is connected to said forward leg.

* * * * *